(12) United States Patent (10) Patent No.: US 7,921,199 B1
Shirriff et al. (45) Date of Patent: Apr. 5, 2011

(54) METHOD AND SYSTEM FOR EVENT NOTIFICATION

(75) Inventors: Kenneth W. Shirriff, Redwood City, CA (US); Alexander G. Vul, Palo Alto, CA (US); Michael B. Goff, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1883 days.

(21) Appl. No.: 10/663,474

(22) Filed: Sep. 15, 2003

(51) Int. Cl.
*G06F 15/173* (2006.01)
*G06F 15/177* (2006.01)

(52) U.S. Cl. ........................................ 709/224; 709/220

(58) Field of Classification Search .................. 709/224, 709/223, 220; 715/736
See application file for complete search history.

(56) References Cited

U.S. PATENT DOCUMENTS

| | | | |
|---|---|---|---|
| 5,748,884 A * | 5/1998 | Royce et al. .................... 714/57 |
| 5,978,828 A | 11/1999 | Greer et al. |
| 6,094,662 A | 7/2000 | Hawes |
| 6,275,858 B1 | 8/2001 | Bates et al. |
| 6,617,969 B2 * | 9/2003 | Tu et al. ........................ 340/517 |
| 6,823,359 B1 * | 11/2004 | Heidingsfeld et al. ........ 709/203 |
| 7,028,264 B2 | 4/2006 | Santoro et al. |
| 7,480,698 B2 | 1/2009 | Potter |
| 2002/0152239 A1 | 10/2002 | Bautista-Lloyd et al. |
| 2003/0001888 A1 | 1/2003 | Power |
| 2003/0023718 A1 | 1/2003 | Smith |
| 2003/0037136 A1 * | 2/2003 | Labovitz et al. ............. 709/224 |
| 2003/0177175 A1 | 9/2003 | Worley et al. |
| 2004/0111507 A1 * | 6/2004 | Villado et al. ............... 709/224 |
| 2004/0111671 A1 | 6/2004 | Lu et al. |
| 2004/0119736 A1 * | 6/2004 | Chen et al. .................... 345/736 |
| 2005/0228736 A1 | 10/2005 | Norman et al. |
| 2006/0184613 A1 | 8/2006 | Stienessen et al. |
| 2006/0190563 A1 | 8/2006 | Vann |

FOREIGN PATENT DOCUMENTS

EP 996266 A1 4/2000

OTHER PUBLICATIONS

US Office Action for U.S. Appl. No. 11/092,147 dated Dec. 2, 2009, 10 pages.
US Office Action for U.S. Appl. No. 11/092,147 dated Jul. 6, 2010, 12 pages.
US Office Action for U.S. Appl. No. 11/092,147 dated Nov. 7, 2008, 21 pages.
Garrett, Jesse James, "Ajax: A New Approach to Web Applications," Adaptive Path, Feb. 18, 2005, http://www.adaptivepath.com/publications/essays/archives/000385print.php, 5 pages.

(Continued)

*Primary Examiner* — Larry Donaghue
*Assistant Examiner* — Brian J Gillis
(74) *Attorney, Agent, or Firm* — Osha • Liang LLP (57) ABSTRACT

A method and system for event notification is disclosed. In one implementation, the system includes at least one node, an event buffer, and a remote computing system. The node is configured to detect situations of interest on that node, and to generate events in response thereto. The node sends the events to the event buffer to be stored therein. The remote computing system is used to monitor the status of the node. The remote computing system obtains from a server a set of status information for the node, and displays the status information. The remote computing system then polls the event buffer for new events, and in response to detecting one or more new events, the remote computing system obtains from the server a set of updated status information for the node. The updated status information is then displayed to show the updated status of the node.

20 Claims, 7 Drawing Sheets

OTHER PUBLICATIONS

"Ajax (Programming)", Wikipedia Encyclopedia online 2005, http://en.wikipedia.org/w/index.php?title=Ajax__%28programming%29&printable=yes, retrieved on Oct. 4, 2005, 8 pages.

Devmo, "Ajax, Getting Started," Mozilla Developer Center, http://developer.mozilla.org/en/docs/AJAX:Getting__Started, retrieved on Oct. 4, 2005, 6 pages.

* cited by examiner

Event Buffer 230

| number (415) | Event (425) |
|---|---|
| 100 | new adapter added |
| 101 | node offline |
| 102 | adapter reconfigured |
| 103 | node online |
| 104 | Etc..... |
| 105 | Etc..... |

METHOD AND SYSTEM FOR EVENT NOTIFICATION

BACKGROUND

Clustering in computer systems means the clustering of multiple computer systems together with communication links between them. As the computing system needs more room to grow, another computer or group of computers may be added to the system thus increasing both storage and processing capabilities of the computing system cluster.

In general, clustering systems connect multiple computers, to function together as a single unit. Administrators of a cluster use an interface to monitor and manage the cluster. One common technique is a browser-based management system. For example, the administrator runs a browser that connects via a network to a web server on one of the cluster nodes. The web server receives requests, gathers the necessary data, and sends the results back to the administrator.

The administrator can perform a variety of monitoring tasks to determine the status of the cluster. For instance, the administrator may wish to see if any cluster nodes have failed, if there are any hardware or software problems, if there are any changes to the configuration, or if the status of any of the hardware or software components has changed.

One difficulty of monitoring cluster configuration through a browser is that web pages are typically static. Once the page has been loaded from the server on the cluster, the page will remain fixed, even if the cluster configuration or status changes.

A simple solution to this problem is to periodically automatically reload the web page, e.g., every 30 seconds. The disadvantages of this method is that the web server must constantly keep providing pages, even if nothing has changed, and the displayed state is not quite up-to-date as changes are delayed by up to 30 seconds. Reloading more often worsens network traffic issues as well as degrades browser performance (e.g., constant reloads will reset the page thereby making reading of the page difficult), while reloading less often worsens the problem of stale information being provided by the browser.

A second solution keeps a connection open between the browser and the server and provides new pages whenever a change occurs, using a technology such as HTTP Server Push. This technique puts a considerable load on the server, since the server must keep track of each browser accessing the data, keep a connection open to each browser, and handle all updates.

Another difficulty of monitoring cluster configuration is that the browser is connected to a single node of the cluster, while changes in configuration or status can occur on any node.

SUMMARY

The present invention provides, in various embodiments, a method and system for event notification. Furthermore, embodiments of the present invention provide a method and system for event notification that may be used in conjunction with a browser. Additionally, the present invention provides a method and system for event notification which reduces the amount of work performed by the server and reduces the amount of traffic on a public network.

In one method embodiment, the present invention stores an event to an event buffer. Then the event buffer is periodically accessed via an event monitor wherein the event monitor checks the event buffer for events related to a computing system on which the event monitor is operating.

In general, embodiments of the present invention utilize an event generation mechanism to generate an event when something of interest occurs on a node of the cluster. In general, the node may be a part of a network of nodes (e.g., a cluster), in which case there may be an event generator on each node in the cluster. Embodiments also provide an event forwarding mechanism which forwards generated events to all other nodes in the network. The event forwarding mechanism may be located in each node in the cluster. An event buffer collects all events that have happened during a short time period and makes these events available to remote systems. For example, the event buffer receives all events from the event forwarding mechanisms throughout the cluster and maintains the events as a file. The buffer may be located on each node for redundancy, or may be a single buffer in one node of the cluster.

Finally, an event monitor, which runs inside the remote computing system periodically checks the event buffer. That is, at a predetermined interval, the event monitor will access the event buffer over a network and check the event buffer for any events which may be of interest to the event monitor. To indicate which events are relevant to the page, each time a page is loaded, code contained in the page will register a list of events with the event monitor. This can be done using well-known techniques such as embedding Javascript code in the HTML page on the browser.

In operation, according to the event notification system, a page may be loaded into the user's browser. The page registers a list of events with the event monitor operating in the browser. The event monitor can be initially loaded and executing in the browser through well-known techniques such as a Java applet. The event monitor periodically queries the event buffer for events. Something of interest happens on the cluster, such as a service failing, etc. An event is forwarded to all nodes of the cluster via the event forwarding mechanism. The event buffer receives the event and adds the event to the event buffer list. The event monitor receives the list of recent events. It then detects the new event and compares the event against the list of relevant events registered by the page. The event is found on the list, and the event monitor directs the browser to refresh the page. The page is then reloaded from the web server, obtaining the status, and is displayed to the administrator. The event buffer then prunes the event from its file. The event monitor may ensure that all the data displayed on a display device of the computing system is refreshed. In addition, there may be a plurality of remote computing systems periodically checking the event buffer. Thus, the job of updating a remote computing system is removed from the server's duties and becomes the responsibility of the remote computing system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF EMBODIMENTS OF THE INVENTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to embodiments of the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "partitioning", "receiving", "processing", "creating", "storing", "utilizing", "accessing", "generating", "providing", "separating", "enqueuing", "dequeuing", "performing", "marking" or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

In one embodiment an event generation mechanism generates an event when something of interest occurs on a node. In general, the node may be a part of a network of nodes (e.g., a cluster), in which case there may be an event generator on each node in the cluster. In addition, an event forwarding mechanism, which forwards generated events to all other nodes, is also found on each node or cluster node in the network.

An event buffer is also utilized on at least one node in the cluster. In one embodiment, the event buffer collects all events that have happened during a short time period and makes these available to a remote system. For example, the event buffer may receive all events from the event forwarding mechanisms throughout the cluster and maintain the events. The events may be organized in a plurality of formats described in detail herein. The buffer may be placed in each node for redundancy or may be a single buffer in any one of the nodes.

An event monitor, which runs inside the remote computing system periodically checks the event buffer. That is, at a predetermined interval, the event monitor accesses the event buffer over a network, and checks the event buffer for any events which may be of interest to the event monitor. The event monitor may ensure that all the data displayed on a display device of the computing system is up to date. For example, if an event of interest to the event monitor is found on the event buffer, then the event monitor may trigger the data display to update thereby showing the latest event. However, if no event of interest to the displayed data is found then the event monitor may not trigger the data display update and no refresh of the display may be performed.

Figure 1:
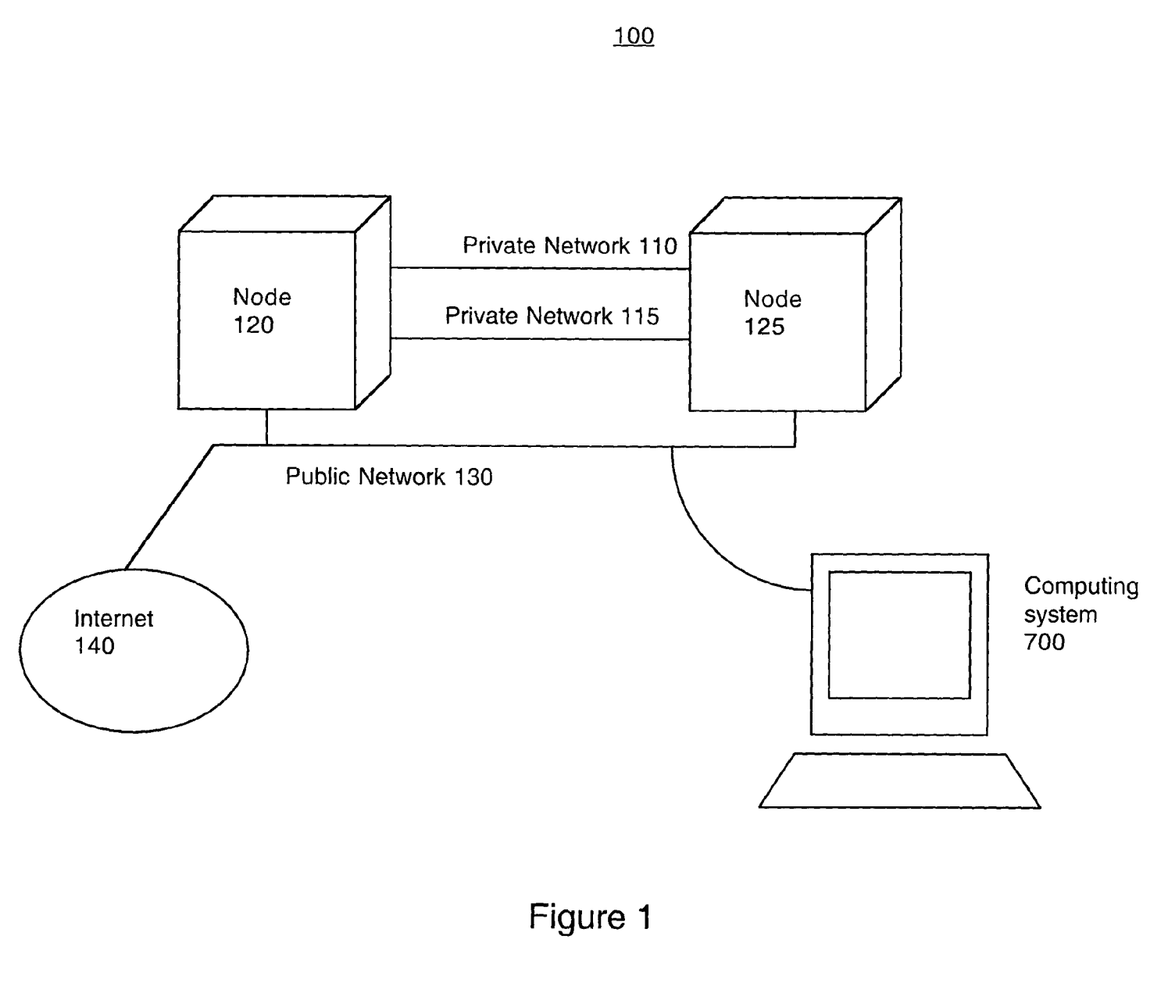
FIG. 1 is a block diagram of an exemplary cluster event notification system in accordance with an embodiment of the present invention.

With reference now to FIG. 1, a block diagram of an exemplary cluster event notification system is shown in accordance with an embodiment of the present invention. System 100 includes nodes 120 and 125. Although two nodes are shown, any number of nodes may be utilized within the exemplary system. System 100 also includes a redundant private network connection. That is, private network 110 and private network 115 accomplish the same duties and are redundant for purposes of network stability. Although a redundant private network is shown, one or more private network connections may be used. System 100 also includes a public network 130 which may be a public or private network. Public network 130 may be an Intranet or Internet network and as shown in one example is a public network. In addition, public network 130 may be wired or wireless. In one embodiment, public network 130 is connected to the Internet 140. System 100 further includes a computing system 700. Further details of computing system 700 are described herein.

Figure 2:
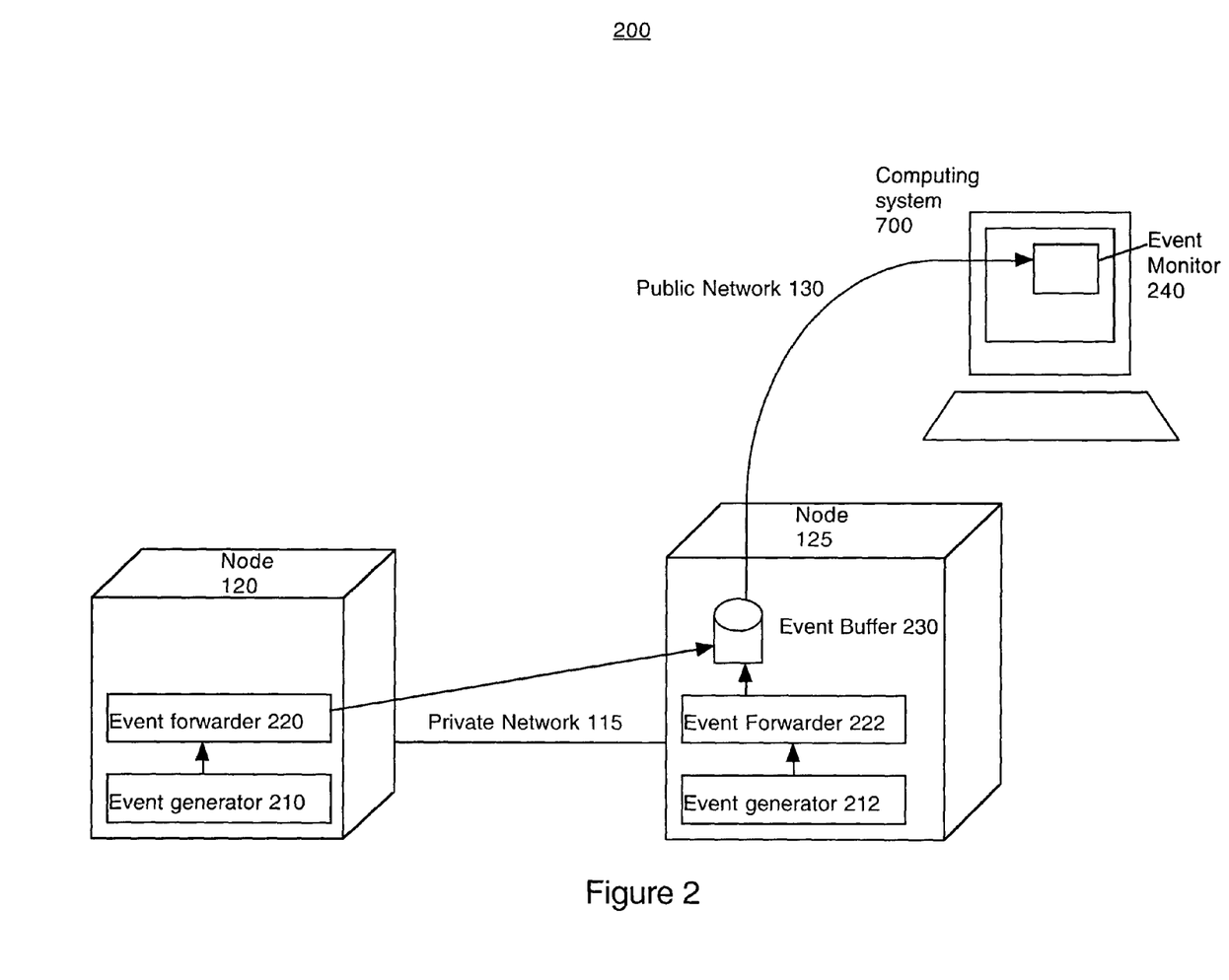
FIG. 2 is a functional diagram of an exemplary cluster event notification system in accordance with an embodiment of the present invention.

With reference now to FIG. 2, a functional diagram of an exemplary system for cluster event notification is shown in accordance with an embodiment of the present invention. In general, system 200 is a more detailed block diagram of system 100. Specifically, the nodes 120 and 125 include further details such as event generators 210 and 212 and event forwarders 220 and 222 respectively.

In one embodiment, the event generators 210 and 212 may be a standard component of a cluster network operating system 200 and any of a number of well-known event generation mechanisms can be used. In brief, events are handled through a publish/subscribe mechanism, and the event generator 210 publishes events. Different components of the node (e.g., 120 and 125) software and/or underlying operating system are instrumented so when something of interest occurs (e.g., a system failure, some new service added, a service switch, or a new configuration, change in cluster membership, etc.) an event is generated. Generally, each node contains its own respective generator.

In one embodiment, the event forwarding mechanisms 220 and 222 subscribe to events. When either receives an event from the event generator 210 or 212, the event forwarder (e.g., 220 or 222) sends the event to other nodes (e.g., 120 or 125) using the cluster's private network 115. Event forwarders 220 or 222 on those nodes receive the events and publish the events on those nodes. Generally, each node contains its own respective forwarder.

With reference still to system 200 an event buffer 230 is also found on node 125. In general, the event buffer 230 comprises a subscriber that listens for events. When it receives an event, it adds the event to an internal database (e.g., a log file). In one embodiment, the event buffer 230 periodically prunes the log file as to conform to a certain size. For example, the event buffer 230 may be pruned every 20 seconds. However, any time base may be used. That is, an event may only be stored on the event buffer 230 for a minimum of 20 seconds before it is removed from the event buffer 230. The motivation of pruning is to keep the event buffer 230 size limited, thereby saving disk space, network bandwidth, and load on the event monitor 240. In one implementation, the event buffer 230 may be available through the public network 130. In another embodiment, the event buffer 230 may also be on each node for redundancy. In yet another embodiment, the event buffer 230 may be on more than one node and maintain an event list of a subset of the nodes within the cluster.

In one implementation, the pruning of the event buffer 230 may be accomplished by a daemon process that runs in the background on the node, using well-known techniques. Periodically, the daemon process copies the contents of the log file to a new file, starting from a recorded old file position. During this time, the old file is locked to prevent events from being added, using well-known techniques. The recorded file position is then set to the end of the new file. This new file then atomically replaces the old file using well-known techniques, and the file is unlocked. The daemon process then pauses for the selected time period, such as 20 seconds (or any number interval between 2 and 120 seconds or more) and repeats the steps. In this manner, all event records written to the event buffer log file will remain in the file for at least 20 seconds, and will be removed after at most 40 seconds. If the event monitor accesses the event buffer log file at least every 20 seconds, the event monitor will receive all event records at least once.

Figure 7:
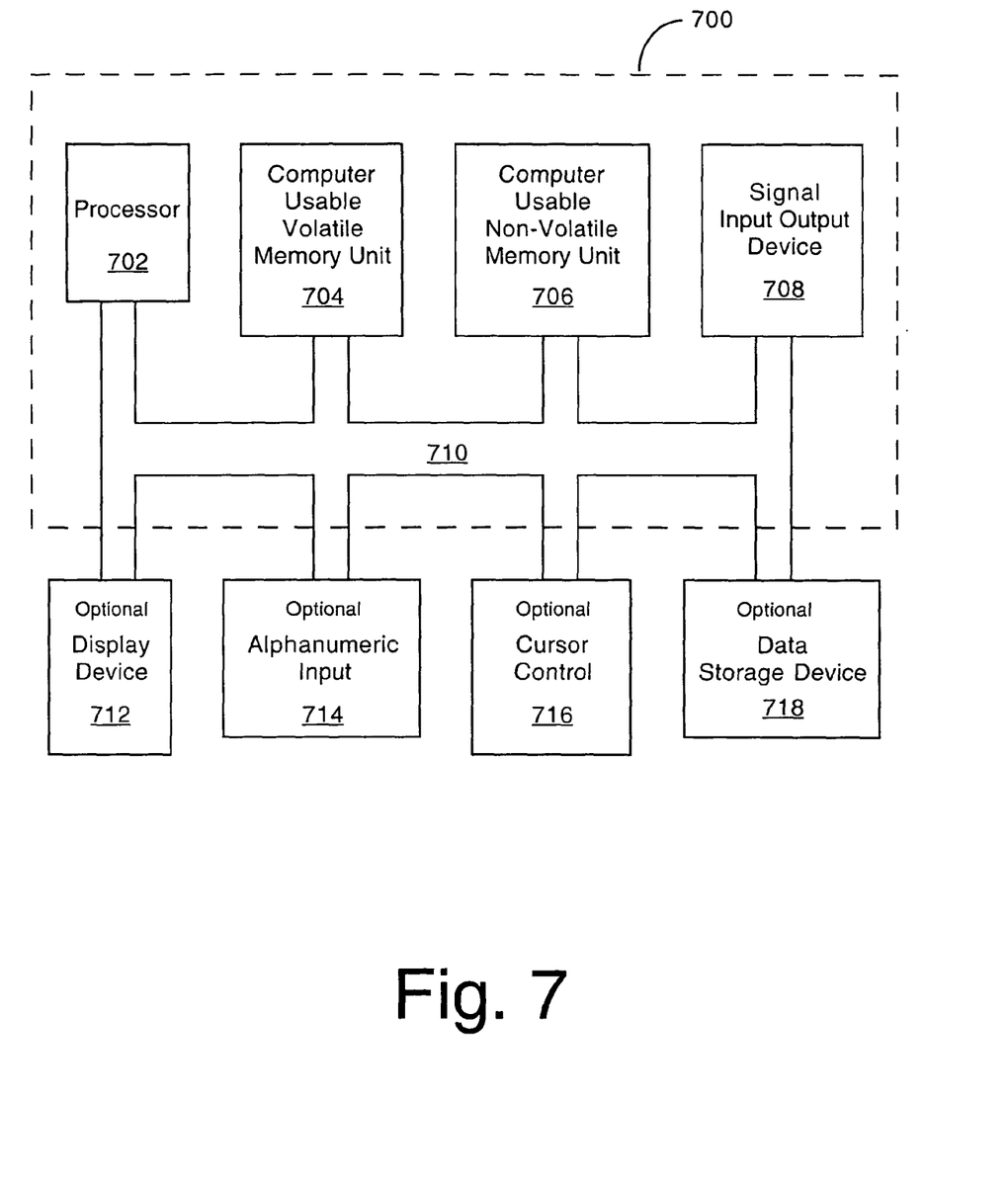
FIG. 7 is a block diagram of an embodiment of an exemplary computer system used in accordance with the present invention.

Event monitor 240 may be a program that runs on computing system 700. In one embodiment, the event monitor 240 may be running on a web browser. In another embodiment, the event monitor 240 may be a stand-alone application which runs on a computing system. For example, event monitor 240 may comprise a Java applet, an ActiveX, or any other type of plugin. In another embodiment, event monitor 240 may be an active database scripting language (e.g., php, jsp, or the like). In another embodiment, event monitor 240 may be a stand alone application written in Java, C++, Pascal, visual basic, or the like.

In general, the event monitor 240 periodically polls the event buffer 230 for a list of recent events. Because the event buffer 230 may be small, or even empty when no events are happening, the poll may have much less overhead than solutions that constantly reload the entire page after a specific time has passed. The browser in combination with the monitor may be used to display a web page for inspection by an administrator to determine the operational status and configuration of the cluster.

In one embodiment, if an event has been received, and the event affects the page that is currently being displayed on the browser, the event monitor 240 will reload the page. Frame-by-frame updates on the page are allowed. Likewise, if the event that is received does not affect the page that is currently being displayed, the event monitor 240 will not reload the page. In one embodiment, to indicate which events are relevant to the page, each time a page is loaded, the page may register a list of events with the event monitor. This may be done using industry-standard and well-known techniques such as, for example, embedding JavaScript code in the HTML page. Although JavaScript is mentioned, any code may be utilized in conjunction with any computing system display method. The event monitor will then keep a table of events for which each frame has registered an interest. In one embodiment, when a page is unloaded from the browser, it will unregister the list of events with the event monitor, again using an industry-standard technique such as JavaScript. In one embodiment, when the event monitor is first loaded, it will query the frames currently loaded into the browser as to the events in which they are interested, to avoid potential race conditions due to the order of frame loading.

In general, the event monitor 240 checks the event buffer 230 for events more often than the event buffer 230 prunes the events. For example, if events in the event buffer 230 are pruned every 30 seconds, then the event monitor 240 should check the event buffer 230 at an interval of less than 30 seconds. Although specific times are mentioned herein, such times are exemplary. Any amount of time may be utilized for either the event buffer 230 or the event monitor 240 as long as the event monitor 240 accesses the event buffer 230 within the pruning time established by the event buffer 230.

Figure 3:
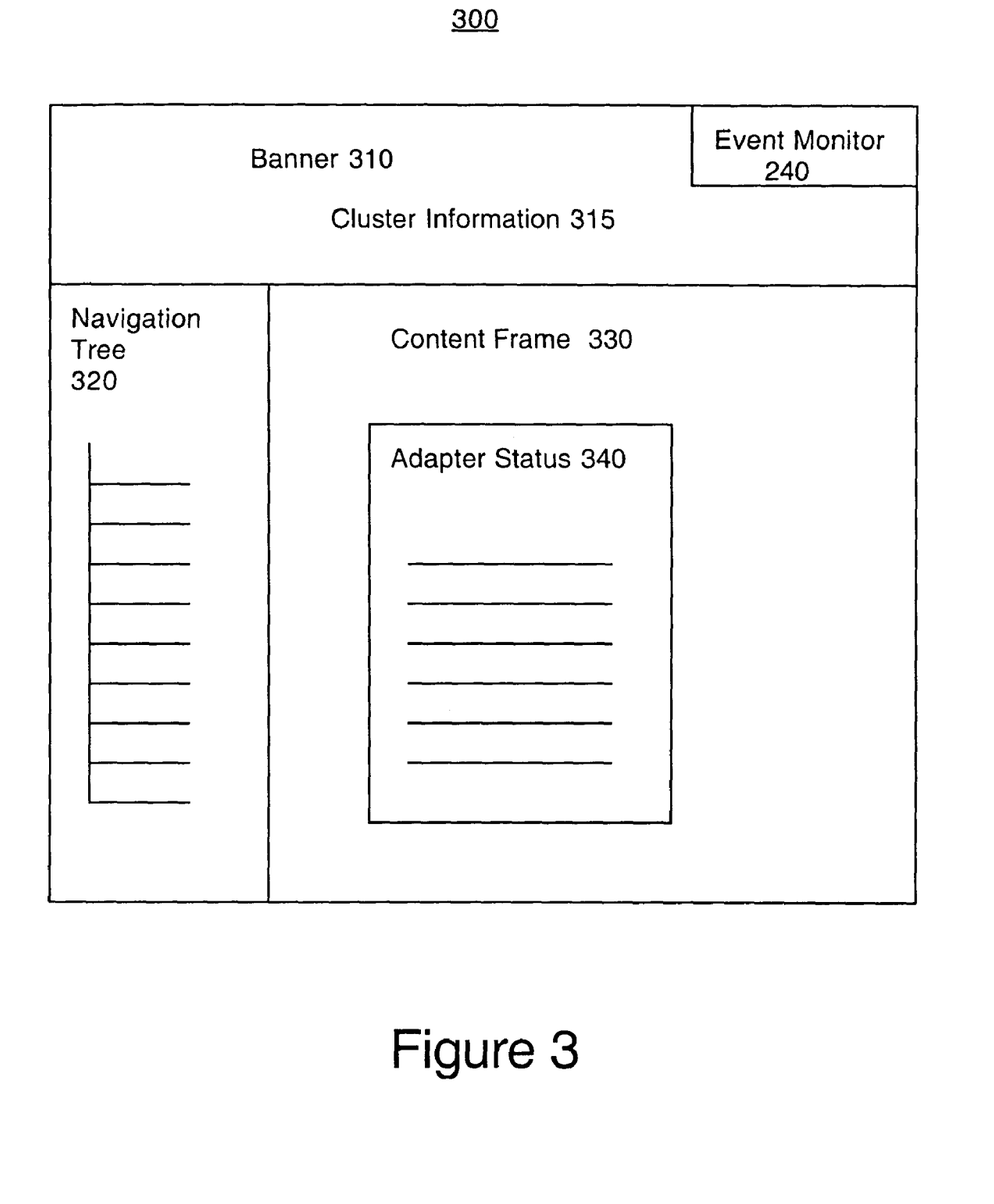
FIG. 3 is a block diagram of an exemplary page displaying cluster status in accordance with an embodiment of the present invention.

With reference now to FIG. 3, a block diagram of an exemplary page 300 displaying cluster status is shown in accordance with an embodiment of the present invention. In general, page 300 is one embodiment of a possible output to a display device. For example, page 300 may comprise a web page displayed in a browser on a remote computing system 700 connected to the network. Page 300 is one implementation which is shown in a framed format. That is, page 300 comprises three portions: a banner portion 310, a navigation tree portion 320, and a content frame 330. Although page 300 is shown in a framed format, page 300 may be displayed in a frameless format, or in a format other than a web page (e.g., a stand-alone application). The utilization of page 300 in a web page framed format is only one embodiment. As discussed above, frame specific page updates are allowed.

With reference still to FIG. 3, exemplary page 300's banner portion 310 may comprise cluster information 315. Cluster information 315 may be the highest level of the network overview. That is, cluster information 315 may display the status of the node operation within the network. For example, cluster information 315 may display which nodes are operational, which nodes are not operational, a combination thereof, an addition of a node, or the like.

Exemplary page 300's navigation tree 320 may be the operational level of the network. That is, navigation tree 320 may display the possible subsystems that are available to the network. For example, navigation tree 320 may list the programs operating on the cluster, any plug-in devices available to (or removed from) the cluster, addition or removal of storage, adapter status, CPU's, network identifiers, or the like.

In addition, selecting the subsystem in the navigation tree 320 menu may cause a more in-depth view of the subsystem to be displayed in content frame 330. For example, adapter status 340 may have been selected as the subsystem to view from the navigation tree 320. By selecting adapter status 340, an in-depth view of the actual operational status, events, issues, problems, performance, and the like, may be viewed. To indicate which events are relevant to the page, each time a page is loaded, the page may register a list of events with the event monitor.

In general, the event monitor 240 controls all three of the frames open on the display device of the computing system. Each time the event monitor 240 receives the events stored on event buffer 230, the event monitor 240 reviews the list for any events which may pertain to the information displayed. If no event relating to the information displayed is found, then the event monitor 240 does not trigger a reload or update of the information on the page 300. However, if an event relating to the information displayed is found, then the event monitor 240 may trigger a reload or update of a frame or frames of page 300. The use of three frames in the particular example as well as the information represented in the three frames is purely exemplary. As stated herein, embodiments may be framed or frameless and may have more or fewer than three frames. For example, a user may have the option of formatting the page 300 in any personalized manner. That is, the page 300 may display only one specific item being monitored, or may include the users list of 25 most important items to be monitored. Therefore, the actual page 300 layout may be infinite in possibilities and arrangements.

Figure 4:
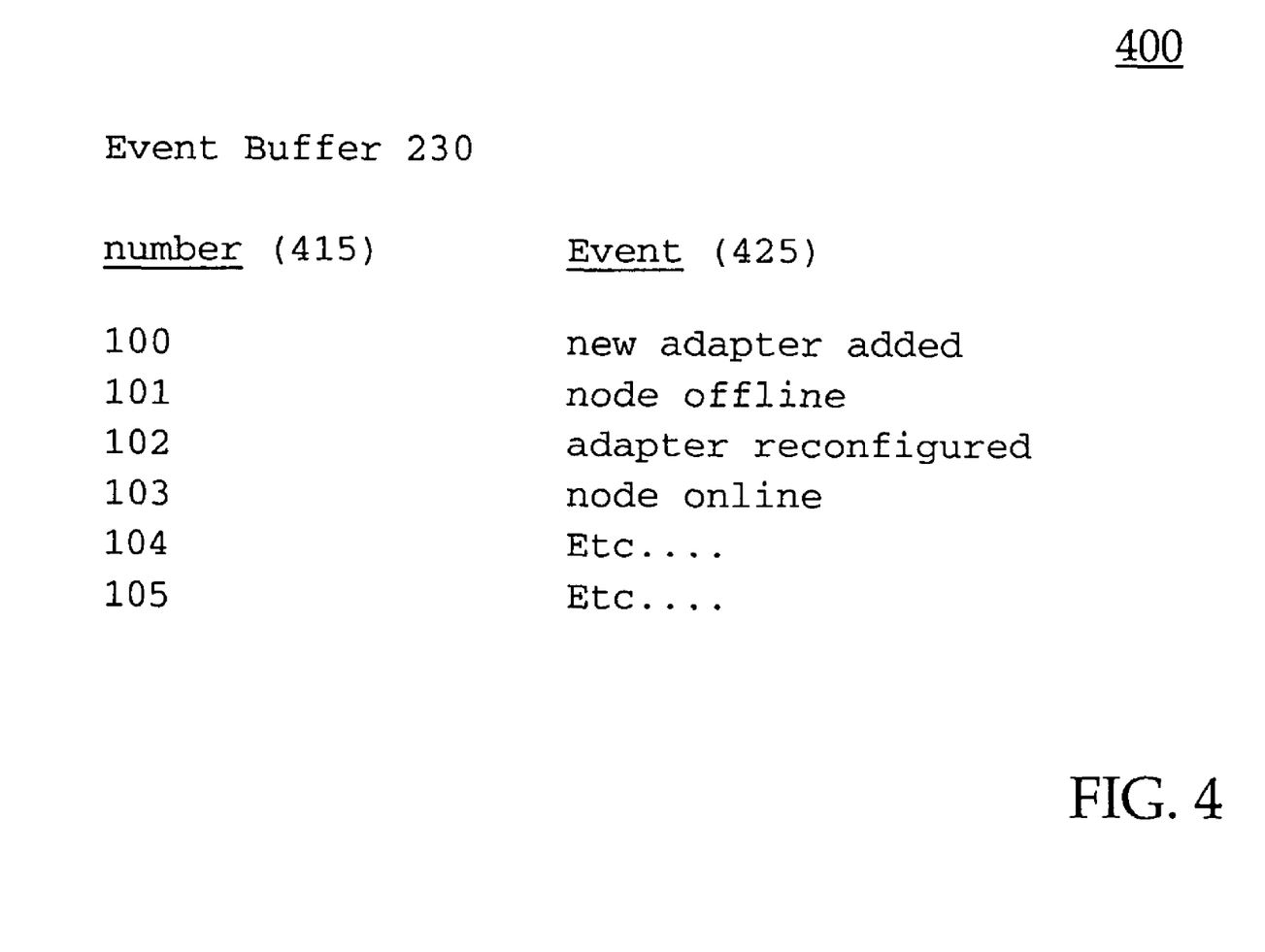
FIG. 4 is an exemplary report of the data on the event buffer in accordance with one embodiment of the present invention.

With reference now to FIG. 4, an exemplary report of the data on the event buffer 230 is shown in accordance with one embodiment of the present invention. The format of the data on table 400 is one of the plurality of possible formats which may be used to maintain a report such that a separate program accessing the event buffer 230 may instantly recognize the previous events accessed. By formatting the event data to include both a sequential id number 415 and event 425, an outside program (e.g., event monitor 240 of FIG. 3) may return to the list of events as often as desired and not process the same event twice. For example, an initial access of event buffer 230 may result in a report having events 101-103. The next access to event buffer 230 by the same entity would result in the report beginning with event number 104. Thus, the program/device accessing the event buffer 230 will not process an event 425 more than one time. It should be recognized that other formats, such as attaching a timestamp to each event, are also possible. In addition, the recorded event may contain a simplified, subsetted, or categorized version of the event data provided by the event generator. For instance, the event generator may provide specific details of the event and the components involved, but the event monitor only needs events at a granularity necessary to decide if a page should be reloaded.

Figure 5:
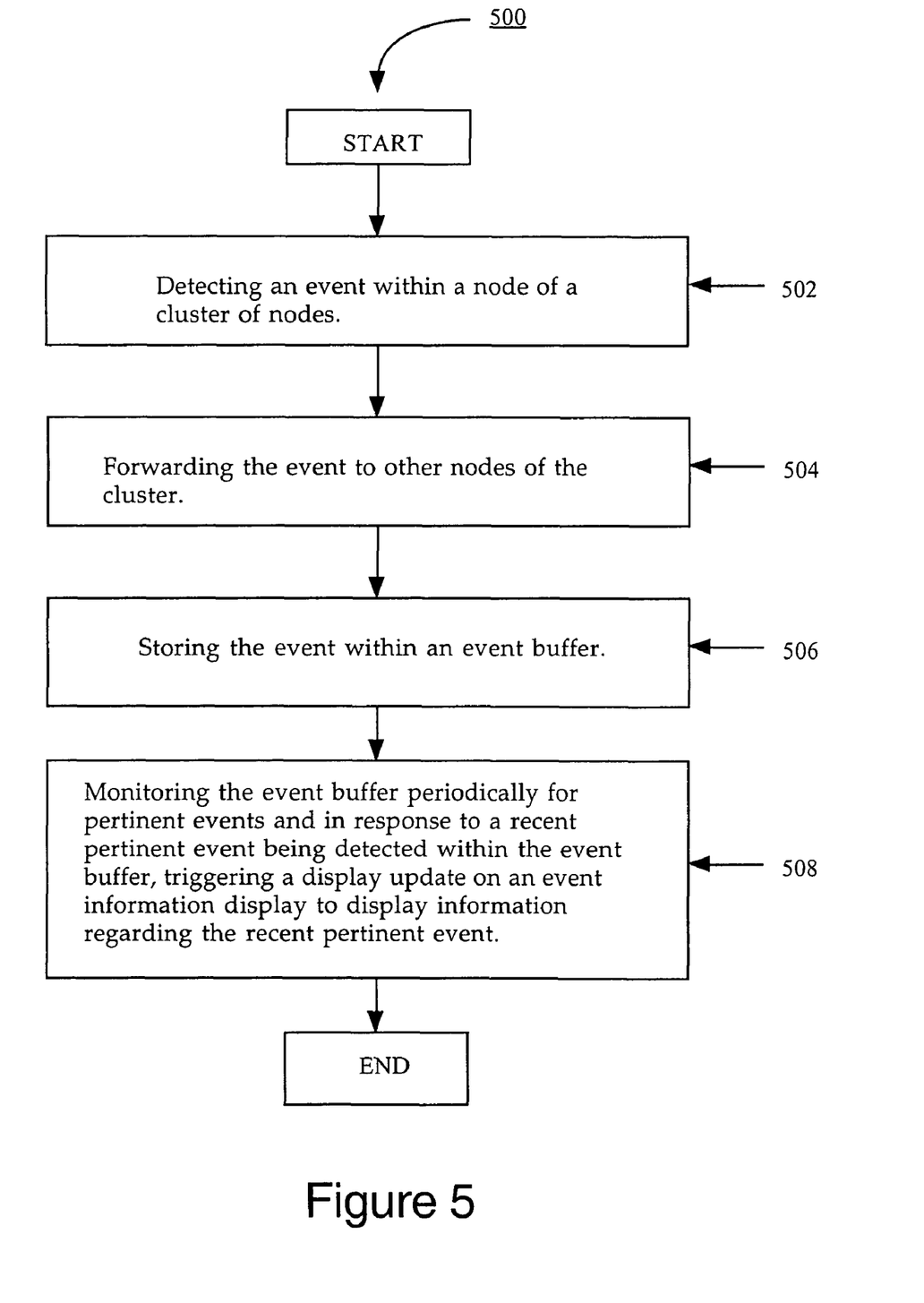
FIG. 5 is a flowchart of steps performed in a method of event notification in accordance with one embodiment of the present invention.

With reference now to FIG. 5, a flowchart 500 of the steps performed for event notification is shown in accordance with one embodiment of the present invention. Flowchart 500 provides a computer-implemented method of monitoring a cluster configuration with a computing system in accordance with one embodiment of the present invention. In one embodiment, a network browser is utilized by the computing system to display the status of the cluster.

Referring now to step 502 of FIG. 5 and FIG. 2, in one embodiment an event may be detected within a node of a cluster of nodes. As stated herein, the event may be anything of interest that happens on a node (e.g., node 120 or 125). The event may be generated by an event generator 210 located on a node in the cluster (e.g., node 120 or 125). In another embodiment, an event generator 210 may be located on each node in the cluster, or each cluster of nodes in the network, or the like.

Referring now to step 504 of FIG. 5 and FIG. 2, in one embodiment the event is forwarded to other nodes of the cluster. Similarly, the event forwarding mechanism 220 may be located on each node, or each cluster of nodes in the network, or the like. The event forwarder may use a private network connection to forward the event to other nodes of the cluster. In addition, the event may be forwarded to the event buffer 230 from the event forwarding mechanism 220.

Referring now to step 506 of FIG. 5 and FIG. 2, in one embodiment an event is stored within an event buffer. For example, a memory resident database may be generated on the event buffer 230. In one embodiment, the event buffer 230 may store the event based on the time the event is received to the event buffer 230. In addition, a time-delayed evictor may be utilized by the event buffer 230 for removing an event after a specific time has passed. Therefore, as described in detail herein, the size of the event buffer 230 may be limited from becoming too large by constantly pruning events from the event buffer 230 after a certain time has passed. In addition, with reference to FIG. 4, the event buffer 230 may be formatted to assign a number 415 to each event 425 such that, as stated herein, an outside program (e.g., event monitor 240 of FIG. 3) may return to the list of events as often as desired and not report the same event twice. The event buffer 230 may be located on every node in the cluster, on only one node in the cluster, or one cluster of nodes in the network, or the like.

With reference now to step 508 of FIG. 5 and FIG. 2, in one embodiment, the event buffer 230 is monitored periodically for pertinent events via an event monitor 240. In addition, if a recent pertinent event is For example, the event monitor 240 may check the event buffer 230 for events occurring within the cluster or within nodes on the cluster which are related to information displayed on computing system 700 on which the event monitor 240 is operating. The computing system 700 display may be an administrative tool for monitoring the status of the cluster, or of a node, or of an operation performed by the node, or the like. In one embodiment, the event monitor 240 may be a Java applet operating on a computing system. Furthermore, as described herein, the event monitor 240 may update the computing system 700 if the event on the event buffer 230 is related to information displayed on the display of the computing system 700.

Figure 6:
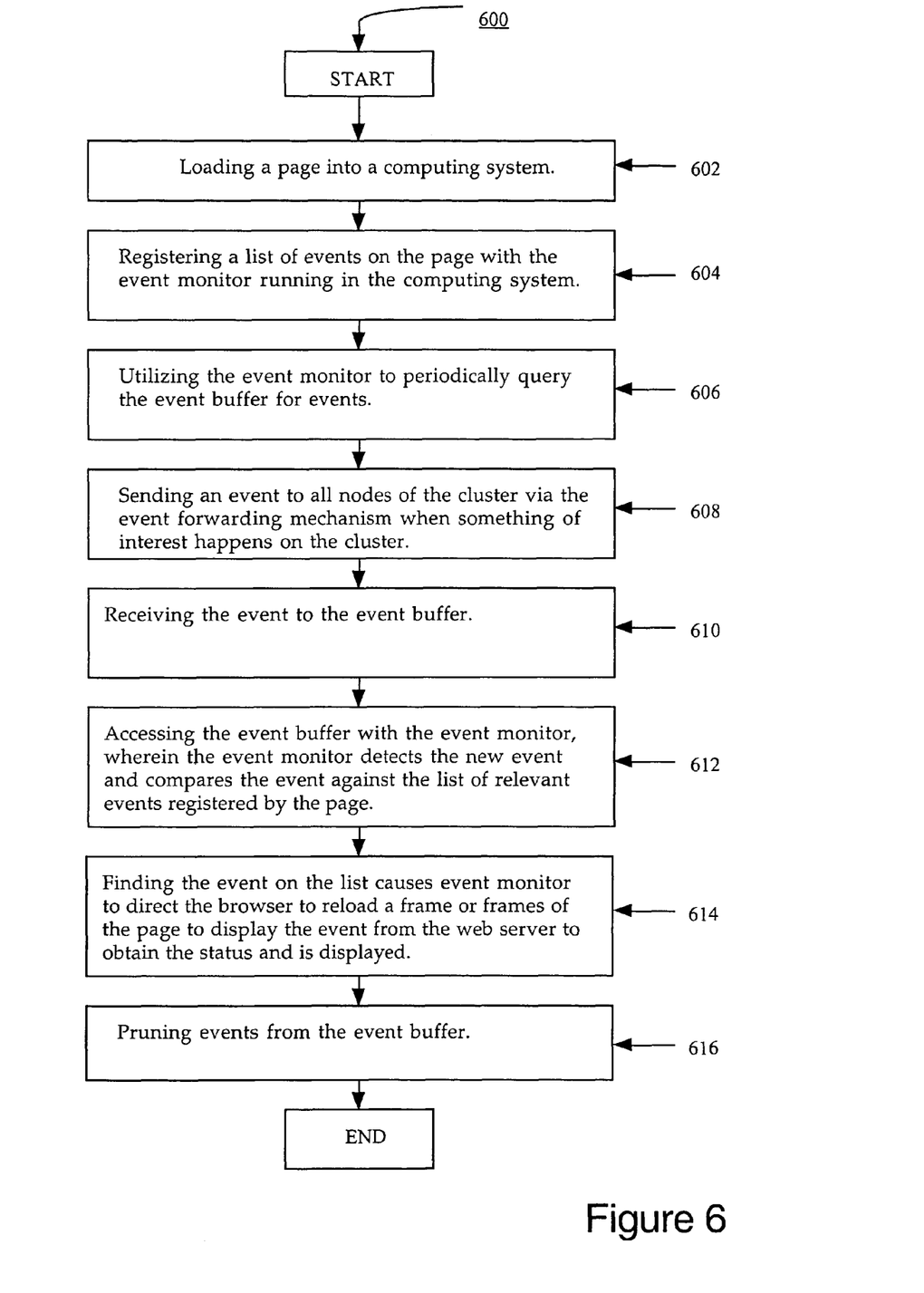
FIG. 6 is flowchart of steps performed for an exemplary method of event notification in accordance with one embodiment of the present invention.

With reference now to FIG. 6, a flowchart of the steps performed for an exemplary computer implemented method of event notification is shown in accordance with one embodiment of the present invention. The steps described herein are exemplary and illustrate one of the plurality of possible embodiments of the present invention.

Referring now to step 602 of FIG. 6 and FIG. 2, in one embodiment a page is loaded into a computing system 700. The page may be loaded into the browser or any other software program which may be located on the computing system 700.

With reference now to step 604 of FIG. 6 and FIG. 2, in one embodiment, the page registers a list of events with the event monitor 240 running in the computing system 700. That is, the event monitor 240 maintains a list of the information being displayed on computing system 700 at the present time.

Referring now to step 606 of FIG. 6 and FIG. 2, in one embodiment the event monitor 240 periodically queries the event buffer 230 for events. For example, event monitor 240 may query the event buffer 230 every 15 second. Event monitor 240 may use a public network connection such as the Internet or the Intranet to access the event buffer 230. Furthermore, the connection may be wired or wireless.

With reference now to step 608 of FIG. 6 and FIG. 2, in one embodiment when something of interest happens on the cluster, such as a service failing. An event is sent to all nodes of the cluster via the event forwarding mechanism 220. As stated herein, the event may be generated by an event generator 210.

Referring now to step 610 of FIG. 6 and FIG. 2, in one embodiment event buffer 230 may receive the event. Furthermore, the event buffer 230 may number the event and record the time the event was entered into the event buffer 230.

With reference now to step 612 of FIG. 6 and FIG. 2, in one embodiment the event monitor 240 accesses the event buffer 240 and receives the events. The event monitor 240 then reviews the events and detects any new event. The event monitor 240 then compares the new event against the list of relevant events registered by the page. If the event is found on the list, the event monitor directs the browser to refresh the page. As stated herein, the event monitor 240 may recognize an event as being new via a plurality of means. It may utilize the number assignment of the event, it may utilize the time stamp of the event and compare it to the time stamp of the previous access, or the like.

Referring now to step 614 of FIG. 6 and FIG. 2, in one embodiment a frame or frames of the page may be reloaded from the network, obtain the new status with respect to the event, and display the results on a display of computing system 700 thereby displaying the event. In one embodiment, the network may be an administrator's web server.

With reference now to step 616 of FIG. 6 and FIG. 2, in one embodiment the event buffer prunes the events. As stated herein, the event buffer 230 may prune an event based on the length of time the event has been in the event buffer 230. For example, if the event monitor 240 queries the event buffer 230 every 15 seconds, then the event may be removed from the event buffer 230 after a time greater than 15 seconds thus ensuring the receipt of the event by the event monitor 240.

With reference now to FIG. 7, a block diagram of an embodiment of an exemplary computer system 700 which could be a node, or could be the monitor system used in accordance with the present invention. It should be appreciated that system 700 is not strictly limited to be a computer system. As such, system 700 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 700 to perform specific actions and exhibit specific behavior that is described in detail herein. It should be appreciated that while the present embodiment of the invention executes the event monitor inside a browser, other embodiments are possible, such as executing the event monitor inside an automated computer control system, monitoring system, or datacenter virtualization system.

Computer system 700 of FIG. 7 comprises an address/data bus 710 for communicating information, one or more central processors 702 coupled with bus 710 for processing information and instructions. Central processor unit(s) 702 may be a microprocessor or any other type of processor. The computer 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices and computer systems. The communication interface(s) 708 of the present embodiment may include wired and/or wireless communication technology.

Optionally, computer system 700 may include an alphanumeric input device 714 including alphanumeric and function keys coupled to the bus 710 for communicating information and command selections to the central processor(s) 702. The computer 700 can include an optional cursor control or cursor directing device 716 coupled to the bus 710 for communicating user input information and command selections to the central processor(s) 702.

Thus, the present invention provides, in various embodiments, a method and system for event notification. Furthermore, embodiments of the present invention provide a method and system for event notification in a cluster. Additionally, the present invention provides a method and system for event notification which reduces the amount of work performed by the server and reduces the amount of traffic on a public network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A system for event notification in a cluster of computing devices comprising a plurality of nodes, comprising:
    a web browser, executing on a processor of one of the computing devices, operated by an administrator of the cluster, wherein the web browser is used by the administrator to view a web page displayed by the web browser, wherein the web page comprises status information for the cluster;
    an event buffer comprising a subscriber configured to listen for events and to maintain a log file of received events that are received within a specified period of time;
    an event monitor executing on the web browser and configured to periodically check the log file for events;
    a plurality of event forwarding mechanisms, each on one of the plurality of nodes of the cluster, for subscribing to events, wherein each event forwarding mechanism is configured to forward a received event to other event forwarding mechanisms;
    wherein when a change in the cluster occurs, the event buffer receives an event corresponding to the change from one of the plurality of event forwarding mechanisms;
    wherein the event corresponding to the change is obtained from the event buffer and added to the log file, and
    wherein when the event monitor receives the event corresponding to the change from the log file, the event monitor compares the event corresponding to the change to a list of events relevant to the web page currently displayed in the web browser and refreshes the web page when the event corresponding to the change is found on the list of events.

2. The system for event notification of claim 1, wherein the log file is pruned.

3. The system for event notification of claim 2, wherein the pruning is carried out at timed intervals.

4. The system for event notification of claim 3, wherein the pruning is carried out at said time intervals of between 2 and 120 seconds.

5. The system of claim 3, wherein event monitor polls the event buffer for received events more often than the event buffer prunes events.

6. The system of claim 1, wherein the web page registers the list of events with the event monitor.

7. The system of claim 1, wherein the web browser connects via a network to a web server on one of the plurality of nodes in the cluster.

8. The system of claim 7, wherein the log file is accessible through the web server via HTTP accesses.

9. The system of claim 1, wherein the event monitor is one selected from a group consisting of a Java applet and an ActiveX plugin.

10. The system of claim 1, wherein the change in the cluster comprises one selected from a group consisting of a node is added to the cluster, a node in the cluster fails, a service failure in the cluster occurs, a configuration change in the cluster occurs, and a status change of hardware or software in the cluster occurs.

11. A cluster network for event notification, comprising:
a web browser, executing on a processor of one of the computing devices, operated by an administrator of a cluster, wherein the web browser is used by the administrator to view a web page displayed by the web browser, wherein the web page comprises status information for the cluster;
a plurality of event forwarding mechanisms, each on one of a plurality of nodes of the cluster for forwarding detected events to each other event forwarding mechanism on each other node;
an event buffer comprising a subscriber configured to listen for events and to maintain a log file of received events that are received within a specified period of time;
an event monitor executing on the web browser and configured to periodically check the log file for events;
wherein when a change in the cluster occurs, the event buffer receives an event corresponding to the change from one of the plurality of event forwarding mechanisms;
wherein the event corresponding to the change is obtained from the event buffer and added to the log file, and wherein when the event monitor receives the event corresponding to the change from the log file, the event monitor compares the event corresponding to the change to a list of events relevant to the web page currently displayed in the web browser and refreshes the web page when the event corresponding to the change is found on the list of events.

12. The cluster network of claim 11, further comprising:
an event generation mechanism on each node to generate an event when something of interest occurs within said cluster.

13. The cluster network of claim 11, wherein the refreshed web page displays updated status information for the cluster network.

14. The cluster network of claim 13 wherein said web page registers the list of events with the event monitor.

15. The cluster network of claim 13 wherein said updated status information is displayed in a frame of the web page.

16. The cluster network of claim 11, wherein the event buffer is located on at least one of the plurality of nodes in the cluster.

17. The cluster network of claim 11, wherein the event monitor is a Java applet operating on a remote computing system that is not part of the cluster.

18. A machine-implemented method, comprising:
obtaining, from a server, status information pertaining to one or more components of a cluster system, wherein the status information is displayed on a web page of a web browser;
detecting a change in the one or more components of the cluster system;
forwarding an event generated in response to the detected change to each of the one or more components;
accessing an event buffer, wherein the event buffer comprises a subscriber configured to listen for events and is configured to maintain a log file of received events that are received within a specified period of time;
determining whether the log file comprises the generated event that requires the web page to be refreshed by comparing the generated event corresponding to the detected change to a list of events relevant to the web page currently displayed in the web browser; and
refreshing the web page when the generated event corresponding to the detected change is found on the list of events.

19. The method of claim 18, wherein when the web page is loaded, the list of events is registered as events that require the display of the web page to be refreshed.

20. The method of claim 19, wherein the web page comprises Javascript code for causing the list of events to be registered.

* * * * *